US012447506B2

(12) United States Patent
Benedetti (10) Patent No.: US 12,447,506 B2
(45) Date of Patent: Oct. 21, 2025

(54) VISION ASSEMBLY FOR FRUIT AND VEGETABLE PRODUCTS, AND ASSOCIATED APPARATUS (71) Applicant: UNITEC S.P.A., Lugo (IT)

(72) Inventor: Luca Benedetti, Frazione Savarna (IT)

(73) Assignee: UNITEC S.P.A., Lugo (IT)

( * ) Notice: Subject to any disclaimer, the term of this patent is extended or adjusted under 35 U.S.C. 154(b) by 0 days.

(21) Appl. No.: 18/724,955

(22) PCT Filed: Dec. 20, 2022

(86) PCT No.: PCT/EP2022/087116
§ 371 (c)(1),
(2) Date: Jun. 27, 2024

(87) PCT Pub. No.: WO2023/126262
PCT Pub. Date: Jul. 6, 2023

(65) Prior Publication Data
US 2025/0065374 A1    Feb. 27, 2025

(30) Foreign Application Priority Data
Jan. 3, 2022   (IT) .......................... 102022000000008

(51) Int. Cl.
*B07C 5/342*   (2006.01)
*G01N 21/85*   (2006.01)
*G01N 21/84*   (2006.01)

(52) U.S. Cl.
CPC .............. *B07C 5/342* (2013.01); *G01N 21/85* (2013.01); *B07C 2501/009* (2013.01); *G01N 2021/845* (2013.01)

(58) Field of Classification Search
CPC ......... B07C 5/34; B07C 5/342; B07C 5/3422; B07C 2501/009; G01N 21/85; G01N 2021/845
(Continued)

(56) References Cited

U.S. PATENT DOCUMENTS 4,534,470 A * 8/1985 Mills ...................... B07C 5/3422
209/587
4,693,607 A * 9/1987 Conway ................. G01B 11/00
356/627

(Continued)

FOREIGN PATENT DOCUMENTS

CN      1737547 A * 2/2006   ........... B07C 5/3422
CN    103376261 A * 10/2013   ............. G01N 21/64
(Continued)

OTHER PUBLICATIONS

International Search Report for Application No. PCT/EP2022/087116, dated Apr. 17, 2023, 4 pages.
(Continued)

Primary Examiner — Terrell H Matthews
(74) Attorney, Agent, or Firm — CANTOR COLBURN LLP (57) ABSTRACT A vision assembly for horticultural products, which includes at least sequential movement components for fruit and vegetable products along a transfer line and a data acquisition system which includes a first optical vision instrument and a second optical vision instrument, which are arranged respectively in a first operating position and in a second operating position. The first position and the second position are arranged laterally and on opposite sides with respect to an intermediate portion of the line, at a vertical elevation that is higher than that of the intermediate portion. The system also includes at least one third optical vision instrument, arranged in a third operating position, arranged along the line respectively above a portion located upstream or a portion located downstream of the intermediate portion.

10 Claims, 5 Drawing Sheets (58) Field of Classification Search
USPC ......................................................... 209/552
See application file for complete search history.

(56) References Cited

U.S. PATENT DOCUMENTS

| | | | | |
|---|---|---|---|---|
| 4,726,898 A | * | 2/1988 | Mills | ...................... B65G 47/24 |
| | | | | 209/939 |
| 6,888,082 B1 | * | 5/2005 | Blanc | ................... G01B 11/105 |
| | | | | 209/939 |

FOREIGN PATENT DOCUMENTS

| | | | | |
|---|---|---|---|---|
| EP | 1469301 A1 | * | 10/2004 | ........... G01N 21/951 |
| WO | WO-2020246888 A1 | * | 12/2020 | ................ G01J 3/42 |

OTHER PUBLICATIONS

Italian Search Report for Application No. 102022000000008, dated Jul. 5, 2022, 8 pages.
Written Opinion for Application No. PCT/EP2022/087116, dated Apr. 17, 2023, 6 pages.

* cited by examiner

VISION ASSEMBLY FOR FRUIT AND VEGETABLE PRODUCTS, AND ASSOCIATED APPARATUS

CROSS-REFERENCE TO RELATED APPLICATIONS

This application is a 35 U.S.C. § 371 National Stage patent application of PCT/EP2022/087116, filed on 20 Dec. 2022, which claims the benefit of Italian patent application 102022000000008, filed on 3 Jan. 2022, the disclosures of which are incorporated herein by reference in their entirety.

TECHNICAL FIELD

The present disclosure relates to a vision assembly for fruit and vegetable products, and an associated apparatus.

BACKGROUND

As is known, companies operating in the sector of packaging and distribution of fruit and fruit and vegetable products increasingly frequently avail of apparatuses that are at least partially automated, which comprise movement elements that convey those products along a predefined path, along which they undergo a plurality of processes and treatments by virtue of devices of various types.

In this way such apparatuses make it possible to handle great masses of product rapidly and at low cost, while at the same time ensuring the quality standards imposed by statutory regulations and by the expectations of a customer base that is increasingly attentive and demanding.

According to a widely-consolidated general configuration, the products are first separated from each other and then sent individually to a horizontal conveyance means that moves uniformly along a normally straight path, thus transferring the products along a straight trajectory, with regular and uniform motion, maintaining the distance between successive products. Such (normally) straight path determined by the conveyance means will be referred to below using the term "line".

While they advance along this line, the products pass through the field of vision of electronic video cameras or similar vision systems, which by virtue of specially-designed optical processing software programs make it possible to measure one or more parameters of interest, such as for example color, shape, dimensions, sugar content, ripeness, possible rot, weight, etc.

Downstream, the products arrive at an unloading area, where one by one they can be dispatched to one of a plurality of collection containers, by virtue of corresponding devices: the choice of the device and therefore of the container in which to collect each product is made by an electronic unit on the basis (at least) of the information collected by the vision systems just mentioned.

In this manner, it is possible to accumulate in each container all and only those products for which the measured parameter assumes a determined value (or falls within a determined range of values). For example, the various containers can in this way accumulate all the fruits of the same color, or of the same size range, or of the same weight, etc.

Likewise, a container can be designated for gathering products for which analysis has detected defects or problems of rottenness (the scan conducted by the vision systems also extends to the flesh or in any case inside the product).

Therefore it appears evident that a crucial role is played in this context by the vision systems, which need to be capable of acquiring complete and detailed images of the entire product in transit, in order to acquire information that is as complete as possible and to have the certainty of intercepting any defect, at any point, of the product itself.

In particular, in the case for example of cherries, it is first of all conventional practice to place the video cameras inside a tunnel, in order to screen the area of vision (passed through obviously by a portion of line) from the surrounding environment. Furthermore, precisely in order to ensure a more exhaustive gathering of information about the product, the video cameras are placed at three separate viewpoints: a first viewpoint is arranged directly above the line (on the vertical), while two others are arranged beside the first, at the same vertical elevation and transversely to the advancement direction of the products identified by the line. Effectively, the three points are aligned horizontally and are contained on an ideal plane perpendicular to the trajectory imposed by the line (by respective movement means) on the cherries.

At the same time, while they pass through the tunnel and the vision area in particular, the cherries are rotated about a horizontal axis perpendicular to the path of advancement, so as to make the peduncle (or stalk) rotate at the same time: at the entrance to the tunnel the peduncle is oriented longitudinally so as to lie downstream or upstream of the fruit itself, while at the exit it lies in the opposite direction.

Thanks to the presence of video cameras which observe each cherry from the three viewpoints described previously and, preferably, thanks to the choice to rotate the cherry at the same time, it is possible to acquire detailed information on each one of them.

This embodiment is however not devoid of drawbacks.

In fact, even by adopting a system with multiple video cameras in the ways just described, the surface portion of the fruit located on the side diametrically opposite to the peduncle is effectively kept constantly lying on the respective conveyance unit and at any moment is at least partially hidden from the video cameras.

This evidently represents a source of risk, in that any defects present on the corresponding surface of the fruit (or in the inner layers immediately beneath) will not be correctly detected, so determining possible errors in the final phase of conveyance and exit.

SUMMARY

The aim of the present disclosure is to solve the above mentioned problems, by providing a vision assembly that is capable of exhaustively scan the entirety of each fruit and vegetable product in transit.

Within this aim, the disclosure provides a vision assembly that enables a complete analysis of the entirety of the surface of each fruit and vegetable product, without overlooking any portion.

The disclosure provides an assembly that is capable of viewing the entire surface of each cherry, without overlooking any portion thereof.

The disclosure also provides an assembly and an apparatus that ensure high reliability of operation and which ensure maximum efficacy in the viewing of cherries and other fruits, so as to enable an optimal categorization thereof.

The disclosure further provides an assembly and an apparatus that adopt an alternative technical and structural architecture to those of conventional assemblies.

The disclosure also provides an assembly and an apparatus that can be easily obtained starting with elements and materials that are readily available on the market.

The disclosure provides an assembly and an apparatus that are of low cost and safely applied.

This aim and these and other advantages which will become better apparent hereinafter are achieved by providing an assembly and an apparatus according to the claims.

BRIEF DESCRIPTION OF THE DRAWINGS

Further characteristics and advantages of the disclosure will become better apparent from the description of a preferred, but not exclusive, embodiment of the assembly according to the disclosure, which is illustrated by way of non-limiting example in the accompanying drawings wherein.

DETAILED DESCRIPTION OF THE DRAWINGS

With particular reference to the figures, the reference numeral 1 generally designates a vision assembly for fruit and vegetable products A.

The scope of protection claimed herein extends also to the use of the assembly 1 for treating any fruit and vegetable product A (fruit, whole vegetables, cut vegetables, etc.). Furthermore, even though typically the assembly 1 is designed, dimensioned and used for handling a single fruit and vegetable product A, the possibility is not ruled out of its being loaded with two or more types of product A simultaneously, or of its being converted to a different product A, subsequently to its installation and its initial use.

Likewise, in the preferred (but not exclusive) application, the product A is a fruit and in particular it is a cherry, which has small dimensions and low weight and may be attached to a peduncle (or stalk) B.

The assembly 1 can be used in any context and with any purpose (so, for example, for any activity involving handling and managing fruit and vegetable products A), while remaining within the scope of protection claimed herein. At the same time, a specific example of application of significant practical interest will be given in the discussion below, for the purposes of non-limiting example of the disclosure.

The assembly 1 comprises at least sequential movement means 2 for the fruit and vegetable products A along a transfer line 3. By sequential movement (or movement in sequence) what is meant is that the fruit and vegetable products A are moved along the line 3 (typically but not necessarily straight) in series, one after the other, typically at a distance (between consecutive products) that is predefined and constant. Effectively, with the term "line" 3, what should be understood here is the path imposed on the products A by the means 2.

Moreover, it should be noted that the means 2 identify an advancement direction along the line 3 for the products A: in the discussion below, the terms "upstream" and "downstream" will therefore be used in accordance with common convention, with reference to this advancement direction (from left to right in FIGS. 3 and 4), from feeding to unloading.

Figure 1:
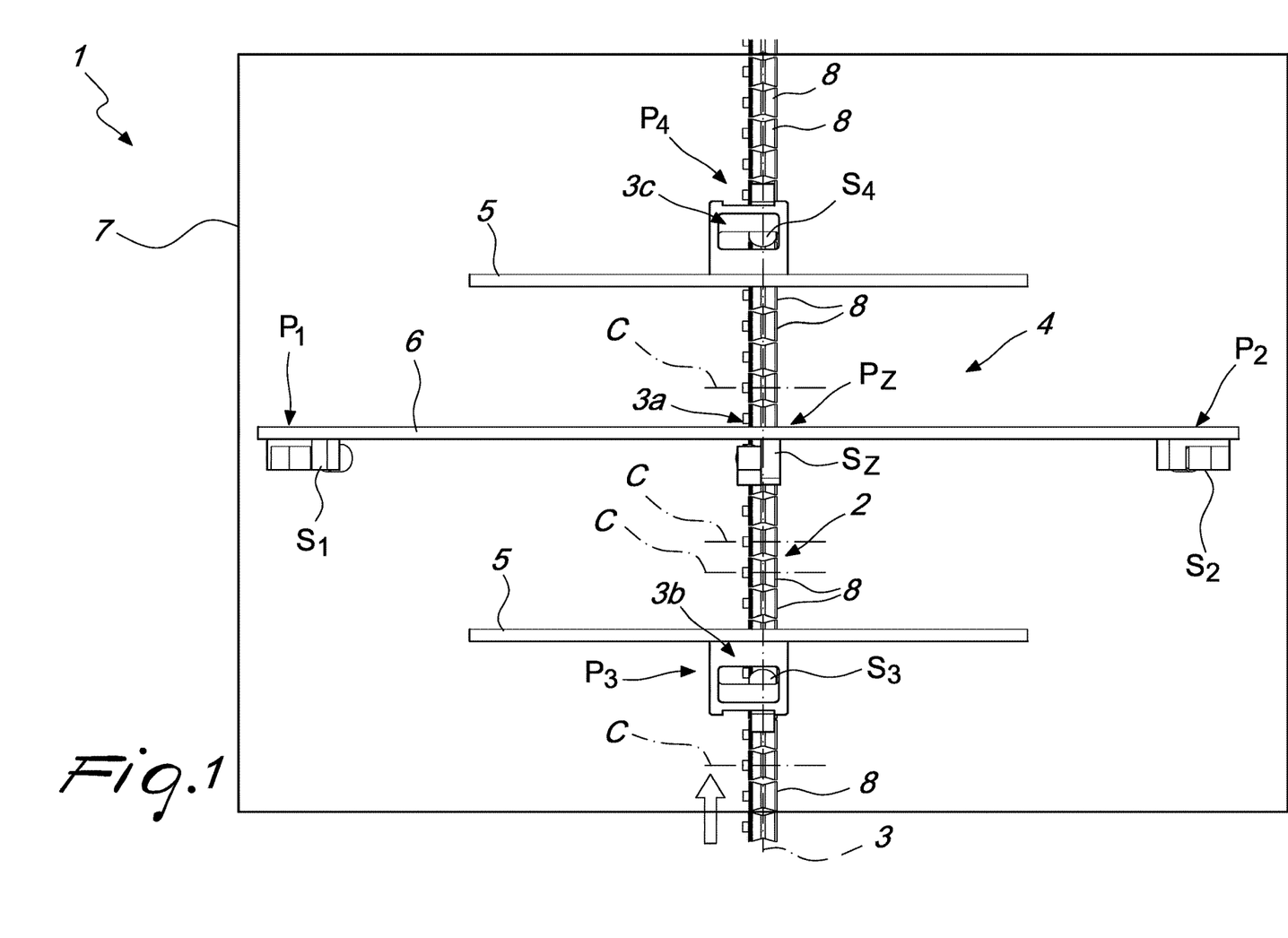
FIG. 1 schematically illustrates the assembly according to the disclosure, seen from above.

Furthermore, as shown for example in FIG. 1, the assembly 1 comprises at least one data acquisition system 4, which in turn comprises a first optical vision instrument $S_1$ and a second optical vision instrument $S_2$, which are arranged respectively in a first operating position $P_1$ and in a second operating position $P_2$.

The first optical instrument $S_1$ and the second optical instrument $S_2$ are configured to acquire images and/or data of interest for each product A in transit along the line 3.

The term "operating position" in the present description is used to mean a delimited region of space, in which at least one respective instrument $S_1$, $S_3$ (or one of the other instruments which will be introduced in the discussion below) can be placed.

The first position $P_1$ and the second position $P_2$ are arranged laterally and on opposite sides (on opposite faces) with respect to an intermediate portion 3a of the line 3, at a vertical elevation that is higher than that of that intermediate portion 3a. The intermediate portion 3a is any "internal" section of the line 3, which does not include the initial end and/or the terminal end. The term "vertical elevation" means the height from the ground or from the ideal resting plane of the assembly 1. In the present discussion, reference will also be made to the longitudinal elevation, measured along an ideal reference axis identified by the line 3 and/or by the direction/path of advancement of the products A along it, with respect to any point of origin "0" (this could be the starting point of the line 3 for example, i.e. the point further upstream).

Figure 2:
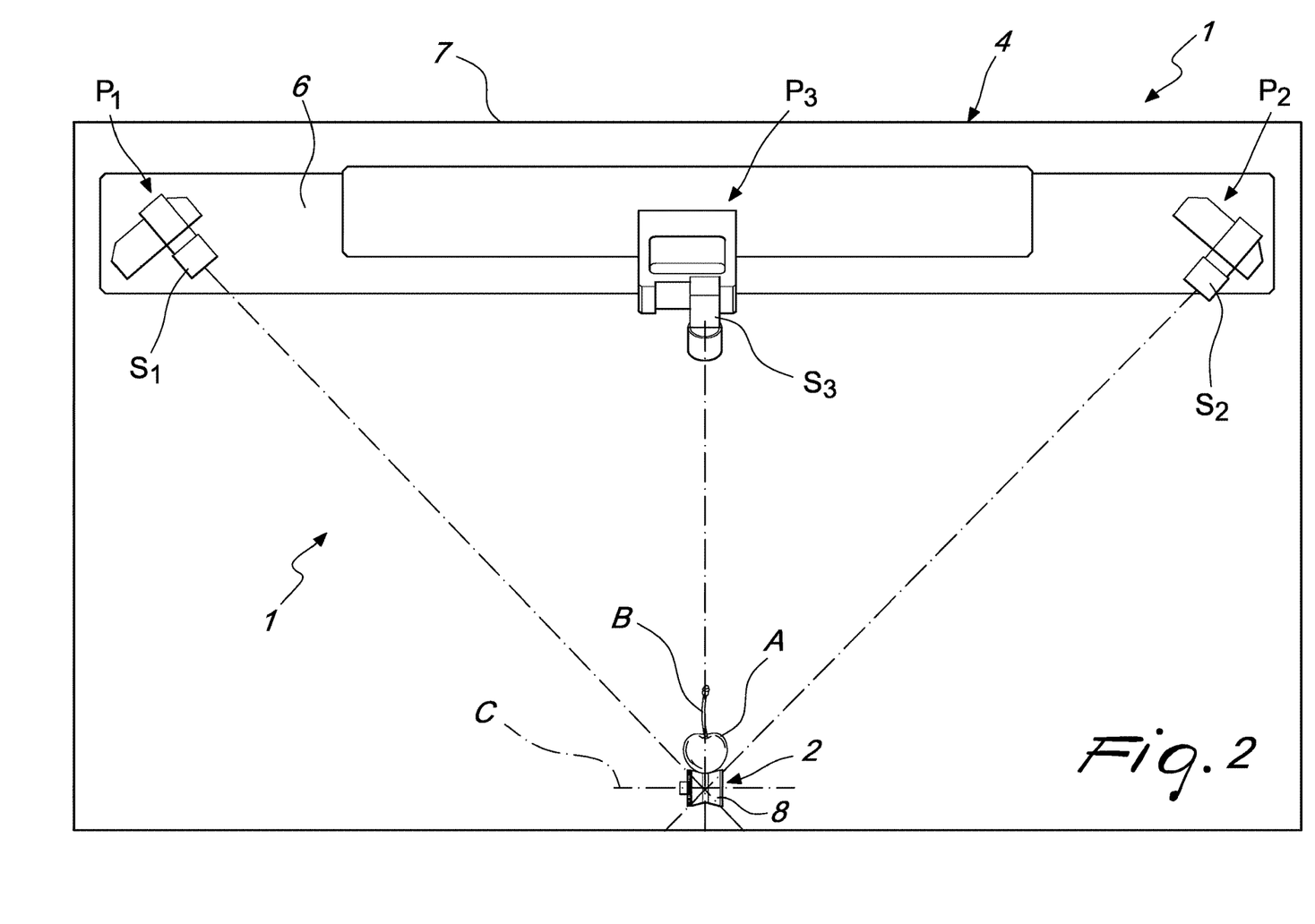
FIG. 2 is a view from behind of the assembly in FIG. 1.
Figure 3:
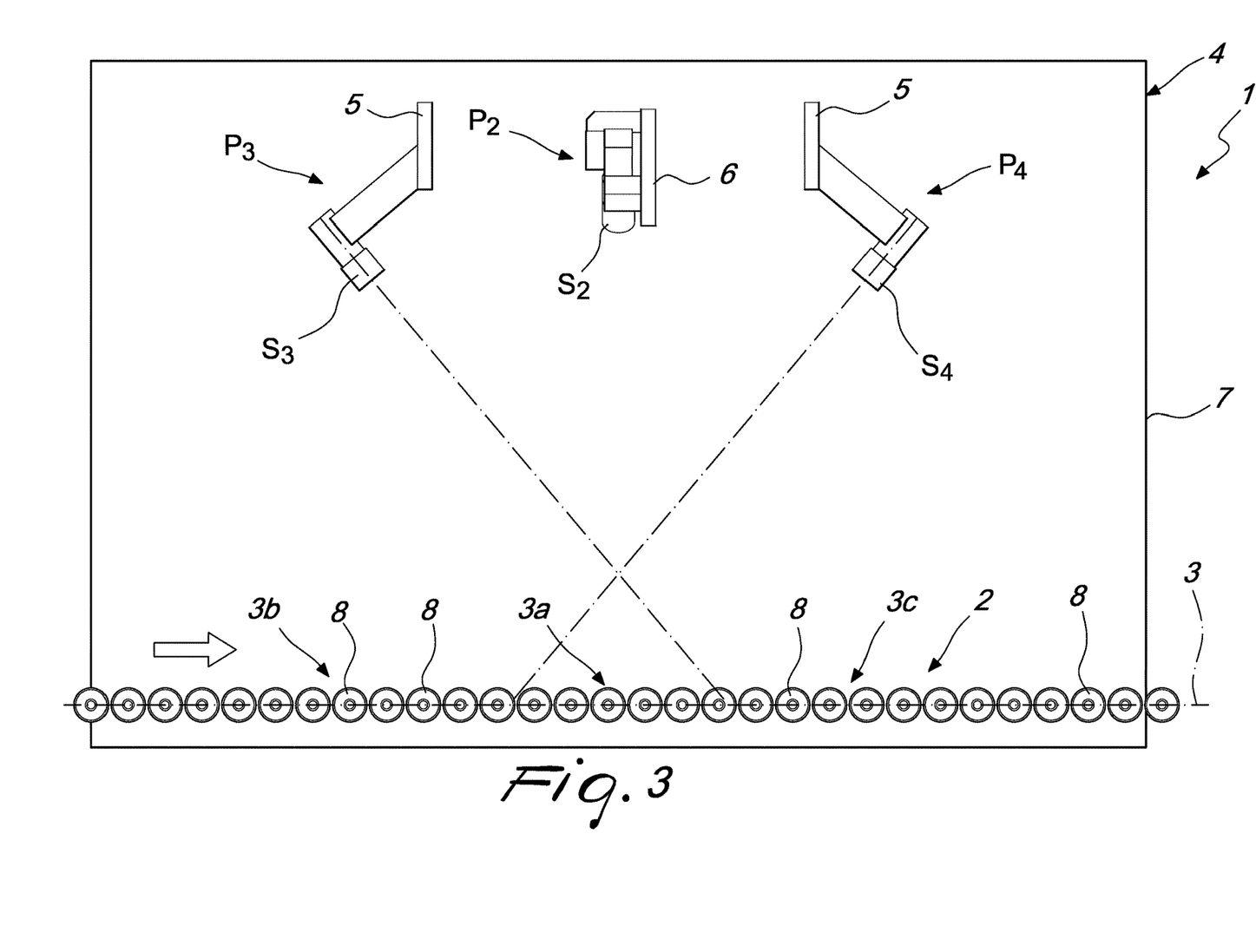
FIG. 3 is a side view of the assembly in FIG. 1.
Figure 5:
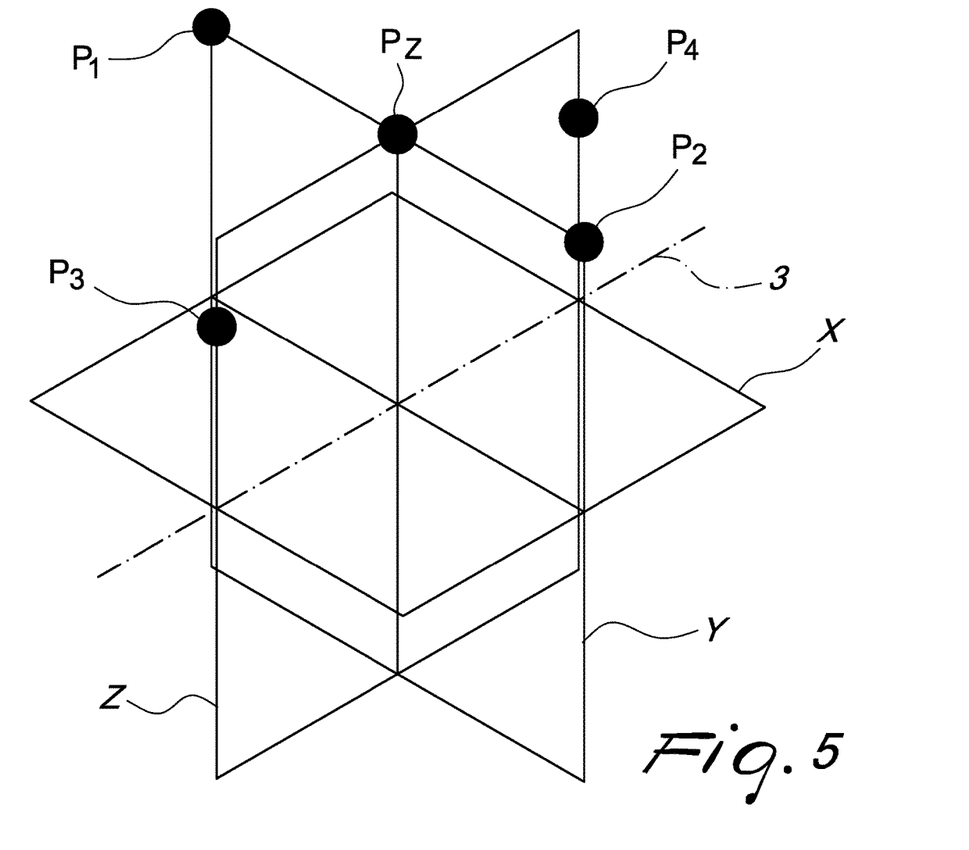
FIG. 5 is a schematic perspective diagram of the spatial distribution of the operating positions with respect to the transfer line, for the assembly of FIG. 1.

In other words, and with specific reference to FIG. 5, if we identify an ideal horizontal plane X, which contains the line 3 (and on which FIG. 1 lies), then typically the first operating position $P_1$ and the second operating position $P_2$ are contained in a first ideal vertical plane Y, which intersects the intermediate portion 3a (and on which FIG. 2 lies), and are arranged to the left and to the right of a second ideal vertical plane Z, which is perpendicular to the other planes just introduced and which contains the line 3 (and on which FIG. 3 lies).

In any case, more generally, the first operating position $P_1$ and the second operating position $P_2$ (and therefore the first instrument $S_1$ and the second instrument $S_2$) are preferably arranged (substantially) symmetrically with respect to the second vertical plane Z, at a predefined distance (height) with respect to the horizontal plane X, although different choices are not ruled out.

In any case, the first instrument $S_1$ and the second instrument $S_2$ are directed downward and typically both toward the intermediate portion 3a (FIG. 2), so as to frame each product A in transit from mutually opposite sides.

The first operating position $P_1$ and the second operating position $P_2$ are preferably at the same distance from the line 3 and from the second ideal vertical plane Z (chosen at will, according to the specific requirements), but the possibility is not ruled out of adopting different distances.

In detail, the first instrument $S_1$ and the second instrument $S_2$ are typically configured to electronically and/or optically acquire information on at least one parameter of interest for each product A in transit, where such parameter is chosen for example from color, shape, dimensions, sugar content, ripeness, possible rot, weight, or the like. The information/images are then electronically processed for various different purposes.

According to the disclosure, the system 4 comprises at least one third optical vision instrument $S_3$, which is also configured to acquire images and/or data of interest for each product A in transit along the line 3 (it can be chosen to be of the same type as the first instrument $S_1$ and the second instrument $S_2$). The third instrument $S_3$ is arranged in a third operating position $P_3$, which is arranged along the line 3 above a portion 3b located upstream (as in the accompanying figures) or above a portion 3c located downstream of the intermediate portion 3a.

In particular, in the preferred embodiment, shown in the accompanying figures for the purposes of non-limiting example of the disclosure, the system 4 also comprises at least one fourth optical vision instrument $S_4$, which in turn is (of the same type as the others and) configured to acquire images and/or data of interest for each product A in transit along the line 3 and is arranged in a fourth operating position $P_4$: the third position $P_3$ and the fourth position $P_4$ are arranged along the line 3 respectively above the upstream portion 3b and the downstream portion 3c (as in the accompanying figures), or vice versa.

In other words, the third operating position $P_3$ and the fourth operating position $P_4$, if present, are placed at a predefined distance (height) with respect to the horizontal plane X and are contained substantially in the second vertical plane Z, upstream and/or downstream of the intermediate portion 3a. The upstream portion 3b and the downstream portion 3c can coincide with an entrance portion and an exit portion, but the possibility is not ruled out of their being spaced apart from the entrance and from the exit. As shown for example in FIG. 3, the third instrument $S_3$ and the fourth instrument $S_4$ are also substantially directed toward the intermediate portion 3a of the line 3, or in any case toward the immediate environments. As mentioned, the third instrument $S_3$ and the fourth instrument $S_4$ (although from different locations) carry out tasks similar to those explained previously for the other instruments, and they can be chosen to be of the same type (or indeed of different types). They therefore are in turn configured to obtain information on at least one parameter chosen from color, shape, dimensions, sugar content, ripeness, possible rot, weight, etc.

As shown for example in FIG. 1, the distance between the intermediate portion 3a (or the longitudinal elevation of the first instrument $S_1$ and of the second instrument $S_2$) and the third operating position $P_3$ on one side, and the distance between the intermediate portion 3a and the fourth operating position $P_4$ on the other side, is preferably the same (chosen at will, according to the specific requirements), but the possibility is not ruled out of adopting different distances.

The third operating position $P_3$ and the fourth operating position $P_4$, defined for example by respective supporting bars 5 (FIG. 1), can be exactly at the same vertical elevation (and at the same vertical elevation as the other positions introduced previously) or they can be arranged (slightly) higher up or lower down (as in FIG. 3).

In any case, by virtue of the chosen placement, it must in any case be ensured that the third instrument $S_3$ and optionally the fourth instrument $S_4$ can frame and view each product A in transit from one or two additional and different directions, making it possible therefore to scan those zones of the product A that might be even only partially hidden in conventional solutions (which adopt video cameras located at the same longitudinal elevation, at the sides of the line 2), effectively achieving, by virtue of such peculiar mechanical configuration, the set aim.

In the preferred embodiment, which in any case does not limit the application of the disclosure, the system 4 also comprises at least one zenith optical vision instrument $S_Z$, configured (like the previous instruments) to acquire images and/or data of interest for each product A in transit along the line 3. The zenith instrument $S_Z$ is arranged in a zenith operating position $P_Z$, arranged above the intermediate portion 3a (on the vertical), substantially between the first position $P_1$ and the second position $P_2$.

The zenith instrument $S_Z$, is also directed downward, right toward the intermediate portion 3a (and the products A in transit along it), and is preferably arranged at the same distance from the first instrument $S_1$ and from the second instrument $S_2$ (and also at the same distance from the third instrument $S_3$ and from the fourth instrument $S_4$). The vertical elevation chosen for the zenith instrument $S_Z$ can be the same as the others or different. Typically the zenith position $P_Z$ is at the intersection of the vertical planes Y, Z, above the intermediate portion 3a.

In particular, the system 4 comprises one or more respective instruments $S_1$, $S_2$, $S_3$, $S_4$, $S_Z$, at each operating position $P_1$, $P_2$, $P_3$, $P_4$, $P_Z$. The number can be the same for each operating position $P_1$, $P_2$, $P_3$, $P_4$, $P_Z$ or it can be chosen to be different in each instance, according to the specific requirements.

In substance, in each operating position $P_1$, $P_2$, $P_3$, $P_4$, $P_Z$ one or more respective instruments $S_1$, $S_2$, $S_3$, $S_4$, $S_Z$ can be arranged, in the sense that:
  in position $P_1$ there can be a single instrument $S_1$ or there can be two or more instruments $S_1$, here not explicitly identified and shown (and when reference will be made to just one of them, the concepts expressed may also be extended to the others),
  in position $P_2$ there can be a single instrument $S_2$ or there can be two or more instruments $S_2$, here not explicitly identified and shown (and when reference will be made to just one of them, the concepts expressed may also be extended to the others),
  and thus likewise for the remaining positions $P_3$, $P_4$, $P_Z$.

In particular, in the preferred embodiment, which in any case does not limit the application of the disclosure, at least one instrument $S_1$, $S_2$, $S_3$, $S_4$, $S_Z$. (and preferably each one of them) is an electronic video camera. The video camera is configured to analyze the images of the products A that transit in its area of view and to process them using an image processing software program with which it is provided (chosen from conventional software programs), so as to acquire the information of interest about the products A.

In the preferred embodiment, this information is transferred to an electronic control and management device, which receives the data from all the instruments $S_1$, $S_2$, $S_3$, $S_4$, $S_Z$ (be they video cameras or otherwise) and analyzes it in order to suitably handle the products A downstream. Moreover, the possibility is not ruled out of the processing software program being part of the device (and not of the individual instruments $S_1$, $S_2$, $S_3$, $S_4$, $S_Z$).

Usefully, the system 4 comprises a supporting beam 6 for the first instrument $S_1$, the second instrument $S_2$ and, preferably, the zenith instrument $S_Z$ (if it is envisaged by the specific embodiment); such beam 6 (lies on the first plane vertical Y and) defines therefore, effectively, the first operating position $P_1$, the second operating position $P_2$ and, preferably, the zenith operating position $P_Z$, which are thus arranged aligned at the same longitudinal elevation.

Usefully, the assembly 1 comprises a tunnel 7 for the line 3 to pass through and for accommodating the system 4 (of instruments $S_1$, $S_2$, $S_3$, $S_4$, $S_Z$). The tunnel 7 can also accommodate the beam 6 (which can be directly or indirectly supported by the latter). In the accompanying figures, only a schematic indication of the tunnel 7 has been shown.

The tunnel 7 makes it possible to screen the line 3 and the instruments $S_1$, $S_2$, $S_3$, $S_4$, $S_Z$ from the surrounding environment, ensuring the same lighting conditions (the conditions deemed most suited to viewing the products A in transit) at all times. In this regard, suitable light sources (fixed or intermittent) can be accommodated in the tunnel 7.

Usefully, the movement means 2 comprise a plurality of axially symmetrical bodies 8, which are aligned and can be moved cyclically along the line 3 (they follow a closed path that comprises a portion that effectively coincides with the line 3). At least some pairs of bodies 8, consecutive, define respective supporting units for corresponding fruit and vegetable products A. These products in fact can be resting on such pairs substantially at the interspace between two consecutive bodies 8. This configuration is shown clearly in FIG. 4 (for the sake of simplicity, for only one product A).

In this regard, it is envisaged to place a product A at each interspace defined between respective consecutive bodies 8, so as to saturate the line 3 and the assembly 1; likewise, it is possible to place products A only at some interspaces (for example one product every two interspaces), in order to maintain more distance between the products A.

The bodies 8 can be simply cylindrical or have a more complex shape, such as for example the shape in the accompanying figures, in which they have an "hourglass" shape.

In any case, the products A are kept simply resting on the bodies 8: these bodies therefore do not obstruct viewing by the instruments $S_1$, $S_2$, $S_3$, $S_4$, $S_Z$.

In this context, the sequential movement means 2 can comprise a chain, a belt, a strap or a similar entrainment element, which is in any case wound around a pulley moved directly or indirectly by a respective motor; the bodies 8 can be coupled to one side of such element and be entrained by the latter along the line 3 and the closed path that they cyclically follow.

Conveniently, each body 8 can rotate about its own (longitudinal) axis of symmetry C, which is oriented horizontally (parallel to the ideal resting plane) and transversely (typically perpendicular) to the movement trajectory of the bodies 8 (imposed by the means 2). The rotation of the bodies 8 (which can be obtained using conventional or new methods) makes it possible to make the products A placed thereon rotate upon themselves, so as to progressively and successively expose the various portions of the entire external surface to the instruments $S_1$, $S_2$, $S_3$, $S_4$, $S_Z$, so that at the end of the line 3, substantially the entire external surface of the fruit and vegetable product A conveyed can be observed and therefore examined.

Figure 4:
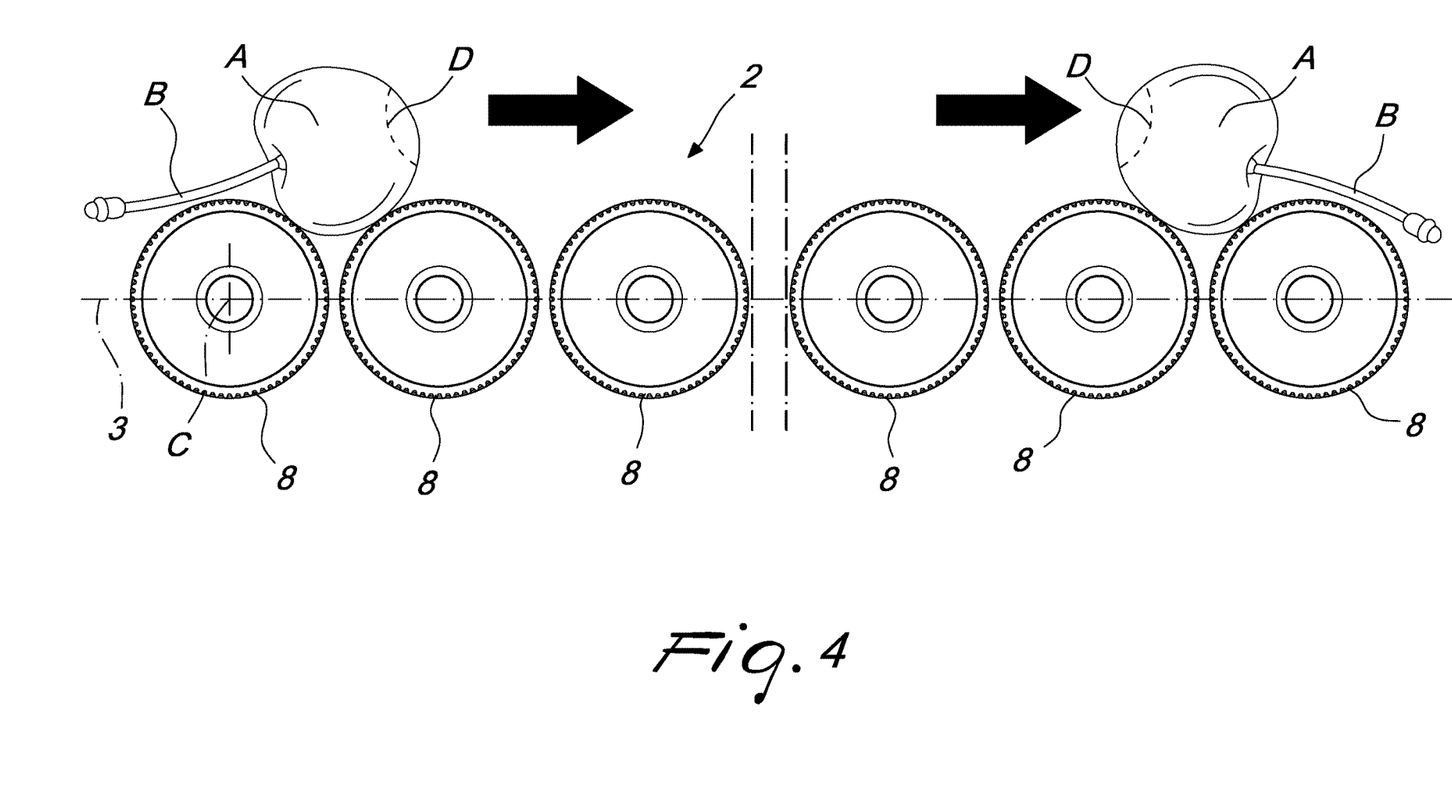
FIG. 4 is a side view showing the transit of a fruit and vegetable product in the assembly of FIG. 1.

With reference to FIG. 4, more specifically it is envisaged that the cherries (the products A in the preferred application) will reach the entrance to the tunnel 7 (or in any case upstream of the portions 3a, 3b, 3c scanned by the instruments $S_1$, $S_2$, $S_3$, $S_4$, $S_Z$) with the peduncle B oriented longitudinally (parallel to the line 3 and/or along the advancement direction of the products A themselves) and placed upstream or downstream of the fruit itself (FIG. 4, left-hand side). The rotation imposed on the cherries by the rotation of each body 8 about its own axis of symmetry C determines the progressive rotation of the peduncle B and in particular the parameters in play will be dimensioned so that, as shown in FIG. 4 on the right-hand side, at the exit from the tunnel 7 (or in any case after the portions 3a, 3b, 3c scanned by the instruments $S_1$, $S_2$, $S_3$, $S_4$, $S_Z$), the peduncle B will be placed on the opposite side with respect to the initial condition.

As has already been pointed out, the scope of protection claimed herein extends to any use of the assembly 1, for any purpose involving handling, management or movement of products A of any type.

At the same time, an object of the present discussion and of the protection claimed herein is a specific type of apparatus 100 for handling fruit and vegetable products A, which makes it possible to enhance the peculiarity of the assembly 1.

Figure 6:
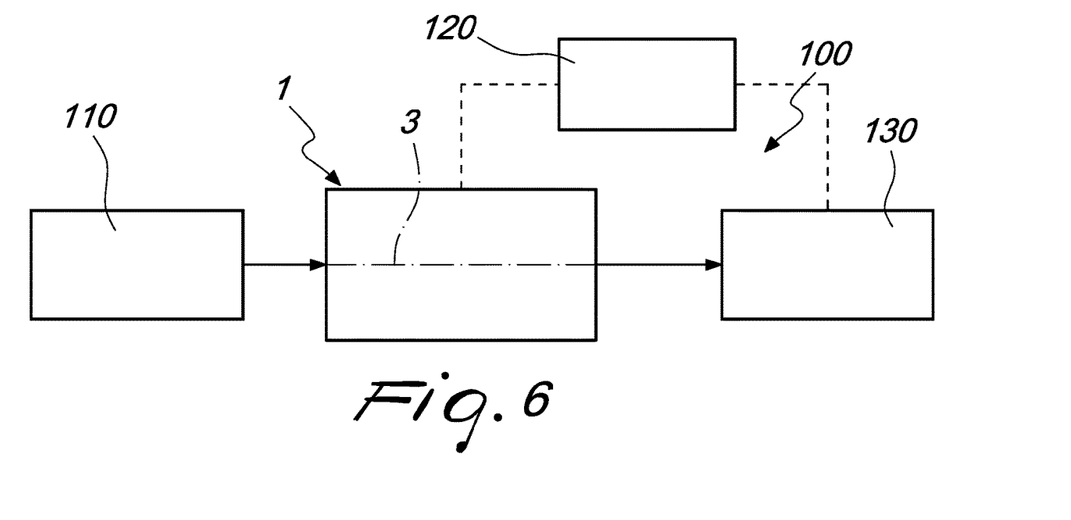
FIG. 6 is a block diagram that schematically illustrates the configuration of an apparatus provided with the assembly of FIG. 1.

In particular therefore, the apparatus 100 comprises first of all a loading station 110, which is configured to feed at least the line 3 with an unsorted mass of fruit and vegetable products A. The products A typically arrive at the apparatus 100 directly from the fields, where they are collected in containers of various kinds indiscriminately, i.e. independently of their size, shape, color, degree of ripening etc.

From the loading station 110 the heterogeneous products A are then sent to the line 3, with the possible interposition of other pre-treatment stations.

The apparatus 100 therefore comprises the assembly 1, according to what is described and explained up to this point, which is arranged downstream of the loading station 110.

The assembly 1 acquires, as seen, images and/or data of interest for each product A in transit along the line 3, by virtue of the various instruments $S_1$, $S_2$, $S_3$, $S_4$, $S_Z$, with which it is provided, which are conveniently arranged along the line 3 itself.

The apparatus 100 further comprises an electronic processing unit 120 (which may coincide with the electronic device mentioned in the foregoing pages), connected to the system 4. The electronic unit 120 for example can be a control unit or an electronic processing unit; typically in any case, it is the same electronic system that governs the operation of the entire apparatus 100.

In addition, the apparatus 100 comprises a selective unloading station 130, which is arranged downstream of the assembly 1 and which is configured for the selective conveyance of each fruit and vegetable product A in transit toward one of at least two distinct collection stations, on the basis of commands imparted by the electronic unit 120 as a function of the information acquired at least from the assembly 1.

The selective unloading station 130 therefore sends each product A to the specific station intended to collect all and only those products A for which the measured parameter takes a preset value (or falls within a preset range). For example, it is possible to have different stations for collecting fruit and vegetable products A of different weight or grammage, or which have different coloring (shades of color), or the like. In other words, the apparatus 100 makes it possible (starting from the unsorted and heterogeneous mass with which the loading station 110 is fed) to divide the fruit and vegetable products A into homogeneous subgroups (each one of which is accumulated in a respective station), while at the same time being able to carry out many other checks and controls.

The operation of the assembly (and of the apparatus) according to the disclosure is already clear from the foregoing description, but will be summarized below in any case.

The means 2 take care of conveying the products A (be they cherries or other products) along the line 3, which is preferably screened off from outside by virtue of a tunnel 7. On the line 3 a system 4 acts which comprises optical instruments $S_1$, $S_2$, $S_3$ and/or $S_4$ and/or $S_Z$, that are capable of analyzing the products A in transit, by obtaining (using methods that are known per se) information about and images of their external surface (in particular, of the portion of the external surface that is directed toward the instruments $S_1$, $S_2$, $S_3$, $S_4$, $S_Z$) and/or the underlying internal layers.

The instruments $S_1$, $S_2$, $S_3$, $S_4$, $S_Z$ thus make it possible to obtain information about one or more parameters of interest (color, shape, dimensions, sugar content, ripeness, possible rot, weight, etc.), which are useful for example for the subsequent separation of the products A into homogeneous subgroups (and/or in order to discard defective products).

The main characteristic of the disclosure consists in that, while the known solutions make it possible to observe the product in transit with only a lateral examination of the opposing surface portions of the fruit and vegetable product, obtained with two video cameras arranged laterally at opposing locations that are generally symmetrical with the line 3, the assembly 1 makes it possible to boost and complete the observation of the product A in transit using one or more further scans, performed at least by a third optical instrument $S_3$ located above the line 3, but upstream or downstream of the longitudinal elevation corresponding to the first optical instrument $S_1$, and optionally by a fourth optical instrument $S_4$ and optionally by a zenith instrument $S_Z$.

So by virtue of the joint action of the first instrument $S_1$, the second instrument $S_2$, the third instrument $S_3$ and optionally the fourth instrument $S_4$ and/or the zenith instrument $S_Z$, the vision assembly 1 (and the apparatus 100 that comprises it) is capable of exhaustively scanning the entirety of each fruit and vegetable product A in transit.

The efficacy of the scan performed by the instruments $S_1$, $S_2$, $S_3$, $S_4$, $S_Z$ is increased in the preferred, but not exclusive, embodiment in which the bodies 8 are made to rotate about their respective axes of symmetry C and therefore the products A upon themselves. In fact, the rotation makes it possible to expose progressively different areas of each product A (while they transit the intermediate portion 3a or in any case the line 3) to the field of view of each instrument $S_1$, $S_2$, $S_3$, $S_4$, $S_Z$, thus ensuring an even more complete analysis of the entire external surface and of the underlying layers (of the entire mass), without overlooking any portion (by virtue of the rotation, each portion of the product A can be correctly observed by at least one of the instruments $S_1$, $S_2$, $S_3$, $S_4$, $S_Z$).

Evidently, these results can also be obtained for cherries: in particular, the disclosure makes it possible to effectively analyze also the portion of the fruit that traditionally is quite difficult to scan (using conventional solutions), i.e. the portion diametrically opposite to the peduncle B, indicated with the reference letter "D" in FIG. 4.

The assembly 1 and the apparatus 100 therefore make it possible to scan the entire surface of each cherry (and/or other fruits or products A), without overlooking any portion thereof and with maximum efficacy, so as to enable an optimal categorization thereof.

disclosure In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The invention claimed is:

1. A vision assembly for fruit and vegetable products, which comprises at least sequential movement means for fruit and vegetable products along a transfer line and a data acquisition system which comprises a first optical vision instrument and a second optical vision instrument, which are arranged respectively in a first operating position and in a second operating position and are configured to acquire images and/or data of interest for each product in transit along said transfer line, said first position and said second position being arranged laterally and on opposite sides with respect to an intermediate portion of said line, at a vertical elevation that is higher than a vertical elevation of said intermediate portion, said system comprising at least one third optical vision instrument, configured to acquire images and/or data of interest for each product in transit along said transfer line and arranged in a third operating position, arranged along said transfer line respectively above a portion located upstream or a portion located downstream of said intermediate portion, said first optical vision instrument and said second optical vision instrument being directed downward, toward said intermediate portion, and said third optical vision instrument being substantially directed toward said intermediate portion.

2. The assembly according to claim 1, wherein said system comprises at least one fourth optical vision instrument, configured to acquire images and/or data of interest for each product in transit along said transfer line and arranged in a fourth operating position, said third position and said fourth position being arranged along said transfer line respectively above said upstream portion and said downstream portion, or vice versa.

3. The assembly according to claim 2, wherein said system comprises at least one zenith optical vision instrument, configured to acquire images and/or data of interest for each product in transit along said transfer line and arranged in a zenith operating position, located above said intermediate portion, substantially between said first position and said second position.

4. The assembly according to claim 3, wherein said system comprises one or more of respective said first, second, third, fourth and zenith optical vision instruments at each one of said first, second, third, fourth and zenith operating positions.

5. The assembly according to claim 3, wherein at least one of said first, second, third, fourth and zenith optical vision instruments is an electronic video camera.

6. The assembly according to claim 3, wherein said system comprises a supporting beam for at least one said first optical vision instrument, one said second optical vision instrument and, preferably, one said zenith optical vision instrument, said beam defining said first operating position, said second operating position and, preferably, said zenith operating position, which are arranged so as to be aligned at a same longitudinal elevation identified by an advancement direction of the products along said transfer line.

7. The assembly according to claim 1, further comprising a tunnel for passing through said transfer line and accommodating said system.

8. The assembly according to claim 1, wherein said movement means comprise a plurality of axially symmetrical bodies, which are aligned and are configured to be moved cyclically along said transfer line, at least some pairs of said axially symmetrical bodies, which are consecutive, defining respective supporting units for corresponding fruit and vegetable products.

9. The assembly according to claim 8, wherein each one of said axially symmetrical bodies are configured to rotate about an own axis of symmetry thereof, which is oriented horizontally and transversely to a movement trajectory of said bodies.

10. An apparatus for handling fruit and vegetable products, comprising at least:
- a loading station configured to feed at least one transfer line with an unsorted mass of fruit and vegetable products,
- an assembly according to claim 1, arranged downstream of said loading station,
- an electronic processing unit, connected to said system,
- a selective unloading station, arranged downstream of said assembly and configured for a selective conveyance of each fruit and vegetable product in transit toward one of at least two distinct collection stations, on the basis of commands imparted by said electronic unit as a function of information acquired at least from said assembly.

\* \* \* \* \*